US012067120B2

(12) United States Patent
Saxe

(10) Patent No.: US 12,067,120 B2
(45) Date of Patent: Aug. 20, 2024

(54) CLASSIFIER GENERATOR

(71) Applicant: Sophos Limited, Abingdon (GB)

(72) Inventor: Joshua Daniel Saxe, Wichita, KS (US)

(73) Assignee: Sophos Limited, Abingdon (GB)

( * ) Notice: Subject to any disclaimer, the term of this patent is extended or adjusted under 35 U.S.C. 154(b) by 306 days.

(21) Appl. No.: 17/530,901

(22) Filed: Nov. 19, 2021

(65) Prior Publication Data
US 2022/0164449 A1 May 26, 2022

Related U.S. Application Data

(60) Provisional application No. 63/116,604, filed on Nov. 20, 2020.

(51) Int. Cl.
*G06F 21/57* (2013.01)
*G06F 21/56* (2013.01)

(52) U.S. Cl.
CPC ........... *G06F 21/57* (2013.01); *G06F 21/565* (2013.01)

(58) Field of Classification Search
None
See application file for complete search history.

(56) References Cited

U.S. PATENT DOCUMENTS

| | | | |
|---|---|---|---|
| 10,133,865 B1 * | 11/2018 | Feinman | G06F 21/56 |
| 10,242,060 B2 * | 3/2019 | Butler | G06F 16/2455 |
| 10,599,844 B2 | 3/2020 | Schmidtler et al. | |
| 11,409,869 B2 | 8/2022 | Schmidtler et al. | |
| 2019/0236273 A1 * | 8/2019 | Saxe | G06F 21/56 |
| 2019/0280918 A1 * | 9/2019 | Hermoni | H04L 41/069 |
| 2020/0004961 A1 * | 1/2020 | Prokudin | G06F 21/567 |
| 2022/0070196 A1 * | 3/2022 | Sarkar | G06N 5/02 |

FOREIGN PATENT DOCUMENTS

| | | | | |
|---|---|---|---|---|
| CN | 110460611 | | 11/2019 | |
| CN | 111753298 A | * | 10/2020 | ........... G06F 21/563 |
| WO | WO-2020180003 A1 | * | 9/2020 | ........... A61B 5/0059 |
| WO | WO- 2022109240 | | 5/2022 | |

OTHER PUBLICATIONS

WIPO, "PCT Application No. PCT/US21/60045 International Preliminary Report on Patentability mailed Jun. 2, 2023", 9 pages.
Anonymous, , "Save and Load Models", XP055894295, Retrieved from the :Internet: URL:https://www.tensorflow.org/tutorials/keras/save_and_load [retrieved on Feb. 22, 2022] Jan. 26, 2022 , 14 pages.
ISA/EP, , "PCT Application No. PCT/US21/60045 International Search Report and Written Opinion mailed Mar. 3, 2022", , 12 pages.

* cited by examiner

*Primary Examiner* — Benjamin E Lanier
(74) *Attorney, Agent, or Firm* — Strategic Patents, P.C.

(57) ABSTRACT

A rule generator can automatically generate a machine-learning-powered detection system capable of recognizing a new malicious object or family of malicious objects and deployable as a text-based, pastable detection rule. The text may be quickly distributed and integrated into existing cybersecurity infrastructure, for example, if the cybersecurity infrastructure supports a rules engine. After initial distribution, the identity may be refined, updated, and replaced. This allows for rapid development and distribution of an initial level of protection, and for updating and improvement over time.

20 Claims, 6 Drawing Sheets

CLASSIFIER GENERATOR

RELATED APPLICATIONS

This application claims priority to U.S. Provisional Pat. App. No. 63/116,604 filed on Nov. 20, 2020, the entire content of which is hereby incorporated by reference.

BACKGROUND

In the field of cybersecurity, when machine learning technology is used in commercial security products it is typically deeply embedded within the products. It is typically challenging or impossible for a customer to add a machine learning classifier to an existing product, and it is challenging to update, replace, or supplement the machine learning technology provided by a vendor. This can make it challenging for the cybersecurity community to effectively share, improve upon, and deploy community-developed machine learning models within defensive infrastructure. It can also be challenging for a vendor to add machine learning technology to their products without substantial rework. It also means that it is generally not possible for the same machine learning models to be run on different products by the same vendor or on products offered by different vendors, which means that the same model may not be possible to run on different elements of network security infrastructure.

Rules engines, on the other hand, have been used in a variety of security infrastructure products. Signature and patterns recognition engines are frequently used as part of static analysis to identify malicious objects. For example, some anti-malware recognition products may use rule engines to interpret rules (sometimes referred to as "identities") to identify malicious or anomalous files or memory extracts. Likewise, tools that are capable of recognizing behavior of devices or behavior of software running on devices may have rules engines that allow for interpretable rules to recognize malicious or anomalous behavior. Log aggregation and analysis tools may provide interpretable rule engines that can be used to interpret rules to identify malicious or anomalous activity.

As an example of a rules engine, YARA is a publicly available open source rules engine "aimed at (but not limited to) helping malware researchers to identify and classify malware samples." As described on the YARA web site (https://virustotal.github.io/yara): "With YARA you can create descriptions of malware families (or whatever you want to describe) based on textual or binary patterns. Each description, or rule, consists of a set of strings and a Boolean expression which determine its logic."

An exemplary YARA rule from the YARA web site is shown in TABLE 1. This rule will have YARA report any file containing one of three strings ($a, $b, $c) to be "silent banker." Although YARA is not a complete programming language, more powerful and complex rules can be created using wildcards, case-insensitive strings, regular expressions, special operators, and other features.

TABLE 1

EXAMPLE YARA RULE

```
rule silent_banker : banker
{
   meta:
      description = "This is just an example"
      threat_level = 3
      in_the_wild = true
   strings:
      $a = {6A 40 68 00 30 00 00 6A 14 8D 91}
      $b = {8D 4D B0 2B C1 83 C0 27 99 6A 4E 59 F7 F9}
      $c = "UVODFRYSIHLNWPEJXQZAKCBGMT"
   condition:
      $a or $b or $c
}
```

Many rule engines provide interpretive functionality, but do not provide a complete programming language.

SUMMARY

A rule generator can automatically generate a machine-learning-powered detection system capable of recognizing anew malicious object or family of malicious objects and deployable as a text-based, pastable detection rule. The text may be quickly distributed and integrated into existing cybersecurity infrastructure, for example, if the cybersecurity infrastructure supports a rules engine. After initial distribution, the identity may be refined, updated, and replaced. This allows for rapid development and distribution of an initial level of protection, and for updating and improvement over time.

In general, it is beneficial to provide the power of a machine learning model in the form of a pastable rule that may be interpreted by a rules engine. This enables the rapid generation and distribution of new machine-learning-powered rules to existing rules engines and to existing security infrastructure. Such rules may be used to recognize a variety of analysis objects, based on the analysis objects and the analysis object features available to rules interpreted by the rules engine. By implementing a new machine-learning-powered classifier as a rule, for example, classifiers based on machine learning models may be developed for specific samples or families of malware, scripts, behaviors, messages, network packets, or other analysis objects. The rules may be quickly disseminated to identify the analysis objects and take appropriate action. For example, the rules may be used to block the spread of such malware.

In general, a machine learning model may be implemented as pastable, interpretable rule that may be implemented on a given rules engine by taking into account the capabilities of a given rules engine, such as what data is available to the rules engine, what feature(s) of the data are available to rules interpreted by the rules engine, and what mathematical or equivalent operations may be included in a rule. Thus, in various aspects, implementing machine learning models as interpretable rules takes into account the capabilities of the rules engine interpreter, where architecture of a pastable rule may be designed or adjusted based on the data, features, and/or instructions available with a given rules engine.

In general, machine learning models may be developed that are designed to be interpreted by rules engines. In some implementations, a model may be transpiled into a plurality of rules that are each based on the model and are each in a format specific to a rules engine. Transpiling a model into different rules, each rule specific to a rules engine, allows the same machine-learning-powered rule to be implemented on different rules engines. This, in turn, allows the same rule to be implemented in different parts of cybersecurity infrastructure and/or to be implemented on infrastructure from different vendors.

In general, in an aspect, a method for extracting a plurality of strings in a set of malicious files and a set of benign files may include determining a subset of the extracted plurality of strings that are most useful in distinguishing the set of malicious files from the set of benign files. The method may include training a machine learning model to use the subset of the plurality of strings to distinguish the files in the set of malicious files from the files in the set of benign files. The method may include translating the machine learning model into a pastable rule that may be interpreted by a rule interpreter, where the rule interpreter may be associated with a computer security application such as a computer security application capable of extracting strings from files. The method may include causing the rule to be run in the interpreter associated with the cybersecurity application to extract strings from files and to recognize malicious files.

In some implementations, the method may include validating the machine learning model by generating a ROC curve for the machine learning model. The method may include storing the rule. The method may include communicating the rule to a rules engine. For example, this may include communicating the rule a rules engine for a remote security application. Thus, the pastable rule, once developed and/or evaluated for effectiveness, may be shared with other security platforms such as independent, remote security platforms managed by other users that can also provide rules interpreters or engines that can interpret the language or syntax of the pastable rule.

In general, in an aspect, a computer program product may include computer readable code embodied in a non-transitory computer readable medium that when executing performs steps that may include extracting features from a set of malicious files and a set of benign files. The features may be obtained from a computer security application, for example, where the computer security application has a rule interpreter. The steps may include determining a subset of the extracted features that are most useful in distinguishing the set of malicious files from the set of benign files. The steps may include training a machine learning model to use the subset of the plurality of features to distinguish the files in the set of malicious files from the files in the set of benign files. The steps may include transpiling the machine learning model into a pastable rule that may be interpreted by the rule interpreter of the computer security application. The steps may include storing the pastable rule in a data store.

In some implementations, the steps may include distributing the rule. In some implementations, the features may be strings extracted from the files. In some implementations, the features may be n-grams extracted from the files. In some implementations, the steps may include validating the machine learning model by generating a receiver operating characteristic (ROC) curve for the machine learning model. In some implementations, the steps may include communicating the rule to a rules engine. In some implementations, the steps may include causing the rule to be run in the interpreter associated with the cybersecurity application to extract strings from files and to recognize malicious files.

In some implementations, the machine learning model includes a logistic regression model. In some implementations, the logistic regression model is translated into logical statement that may be interpreted by a rule interpreter. In some implementations, the logistic regression model may be translated into an equation.

In some implementations, the machine learning model includes a random forest model. In some implementations, the random forest model is translated into a logical statement that may be interpreted by a rule interpreter.

In general, in an aspect, a computer program product includes computer readable code embodied in a non-transitory computer readable medium. The computer readable code may include a pastable detection rule suitable for inclusion in an interpreted rule processing system. The rule may include instructions for determining features of a file based on file features available in the rule processing system. The rule may include instructions for implementing a classifier using instructions available in the rule processing system. The classifier may apply the feature vector as input to a mathematical model including coefficients and/or control flow logic generated using machine learning. The classifier may provide a classification decision as an output based on the features and the mathematical model.

In some implementations, the pastable detection rule is interpretable by an interpreter.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
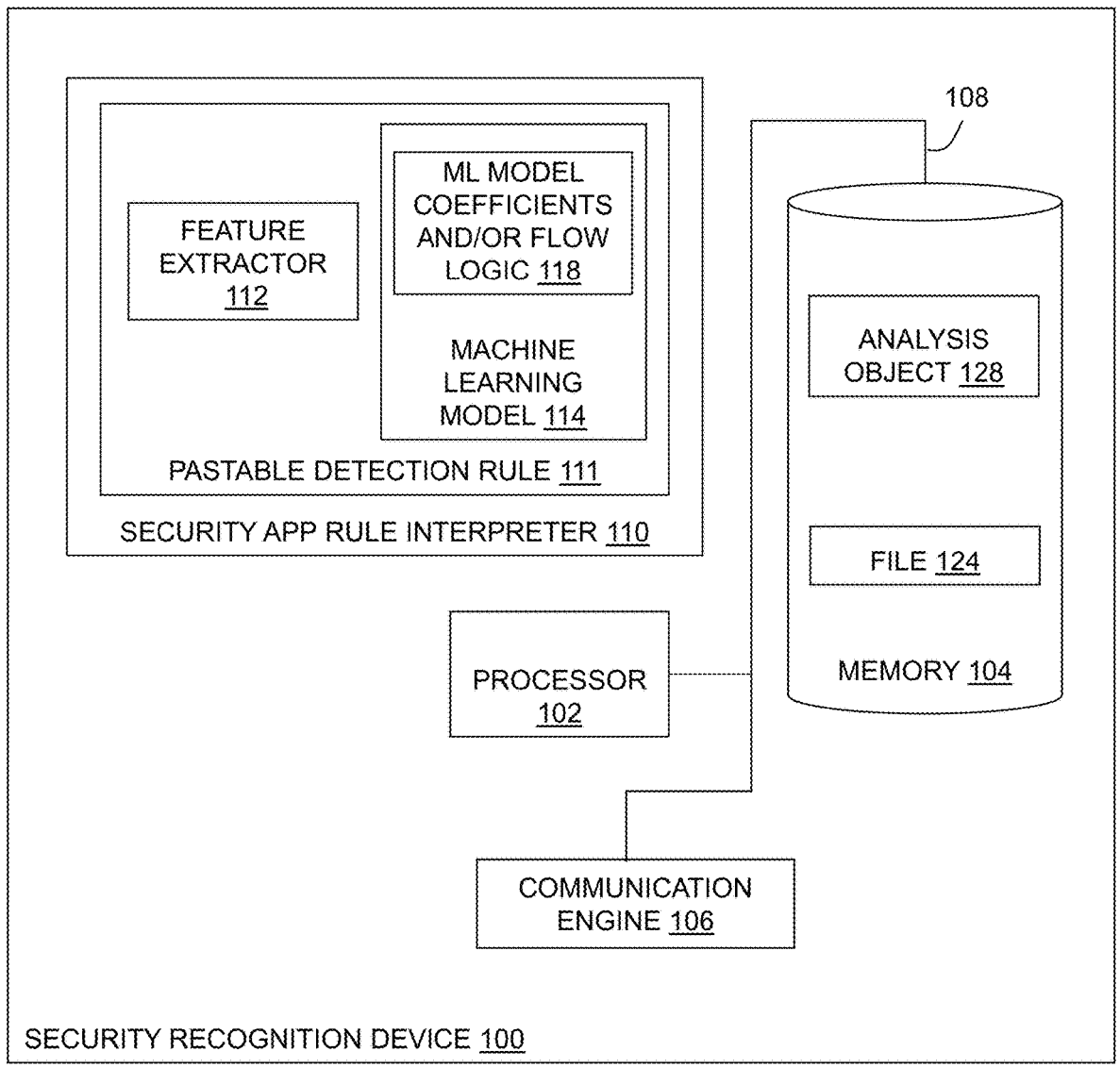
FIG. 1 illustrates a block diagram of a security recognition device according to embodiments.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

In some implementations, a machine learning model, such as a neural network, a logistic regression model, a random forest, or other suitable model, may be trained for a security recognition task. Security recognition tasks may include but are not limited to the recognition of maliciousness, a security threat, suspiciousness, or any other relevant analysis result. For example, a security recognition may include detection of malware. The object of recognition tasks may be any suitable artifact, for example, files (e.g., portable executable (PE) files, script files, text files, HTML files, XML files), documents, processes, network flows, network streams, memory extracts, process memory states, registry entries, messages (e.g., text messages, email messages, social network posts), web sites, databases, browsing histories, or any other suitable analysis object or combination of objects. Recognition tasks may be applied, for example, to features determined by static analysis, dynamic analysis, behavior analysis, activity analysis, or any other suitable features.

In addition to features of an object of analysis, context information also may be included in training data for improved performance. In various implementations, contextual information may include message information, such as message header information, source of a file, message, or network stream, destination of a file, message, or network stream, reputations associated with a sender, receiver or file, profile information associated with a sender or receiver, time zone information, timestamp information, transmission path information, attachment file size, attachment information, domain reputation information, universal resource locators (URLs), fonts or other message content context information, or any other suitable contextual information. The contextual information may be used in combination with the file content information to improve the performance of the recognition task.

In an exemplary implementation, analysis objects may be PE files, and the training data includes file features derived from static analysis of the PE files, for example, strings identified in the files.

FIG. 1 illustrates a block diagram of a security recognition device 100, according to an embodiment. The security recognition device 100 may be a hardware-based computing device and/or a multimedia device, such as, for example, a compute device, a server, a desktop personal computer, a smartphone, a tablet, a laptop and/or the like. These are non-limiting examples, and the security recognition device 100 may be any type of compute instance. As shown, the security recognition device 100 includes a processor 102, a memory 104 and a communication engine 106.

The processor 102 may be, for example, a hardware based integrated circuit (IC) or any other suitable processing device configured to run and/or execute a set of instructions or code. For example, the processor 102 may be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 102 is operatively coupled to the memory 104 through a system bus 108 (for example, address bus, data bus and/or control bus).

The processor 102 may be configured to execute a security application that includes a security application rule interpreter 110. The security application may be any suitable security application, such as an anti-virus or anti-malware program, a log collection application (e.g., SIEM), or a network security application, as non-limiting examples. The security application has an associated rule interpreter, that allows for the integration of rules that may be used for detections of malicious data or activity. The rule interpreter 110 may be part of the security application or may make the security application's data available to the rule interpreter 110. A security application rule interpreter 110 typically provides rule instructions that allow for inspection of data for analysis objects, and comparison of that data for purposes of identifications and alerts.

The security application rule interpreter 110 interprets security rules. The rules may be specified, for example, in a user interface, or stored in a file that is read by the security application. A rule may be compiled by the security application rule interpreter 110 prior to use, for example at the time that it is uploaded or read by the security application rule interpreter 110. A rule may be translated into a bytecode or other code, for interpretation by the security application rule interpreter 110. In some implementations, security rules may have some aspects of a programming language, for example, providing logic statements and/or if/then statements, but not all aspects of a programming language. For example, a given rule interpreter 110 may not be capable of more advanced mathematical calculations or may not have object-oriented concepts.

As shown, the security application rule interpreter 110 interprets a pastable detection rule 111. The pastable detection rule may be provided to the security application rule interpreter 110 in a variety of ways. For example, the pastable detection rule 111 may be copied and pasted into a window in a user interface for the security application rule interpreter 110. The pastable detection rule may be pasted into a file that that is accessed by the security application rule interpreter 110.

The pastable detection rule 111 includes a feature extractor 112 and a machine learning model 114. Each of the feature extractor 112 and the machine learning model 114 may be implemented in the syntax of the security application rule interpreter, stored in memory 104 and executed by processor 102 (e.g., code to cause the processor 102 to execute the feature extractor 112 and the machine learning model 114) and/or a hardware-based device such as, for example, an ASIC, an FPGA, a CPLD, a PLA, a PLC and/or the like.

The feature extractor 112 may be configured to determine features in an analysis object (e.g., one or more of a file, a text stream, a message, etc.) based on the data that is available to a rule running in the security application rule interpreter 110 and that may be examined using the syntax of the security application rule interpreter 110. For example, if the security application rule interpreter 110 has a capability to examine strings or bytes of a file, the features defined in the feature extractor may be instructions to examine the strings or bytes of a file. For example, in an exemplary implementation in which an analysis object is a message, the feature extractor 112 may identify words or characteristics of text in a file (for example, message headers, strings, sub-strings, elements, tags and/or the like). As another example, the security application rule interpreter 110 provides a capability to examine packets in a network stream, the features may be network packet data. In general, the features extractor 112 specifies features from an analysis object to provide to the model 114.

A representation of features may be provided to the machine learning model. Weights may be assigned and/or transformations may be applied. For example, in some implementations, hash functions may be used as transformation functions and/or to identify a position and/or bucket for a feature. As another example, in some implementations, a value associated with a feature may be included at a position and/or bucket. In some instances, positions and/or buckets to which a feature may be assigned may be determined based on the length and/or size of that feature. For example, strings having a length within a first range may be assigned to a first set of positions and/or buckets while strings having a length within a second range may be assigned to a second set of positions and/or buckets. In this way, the resulting features may present a representation of the features of an analysis object.

The machine learning model 114 may be any suitable type of machine learning model such as, for example, a decision tree model, a gradient boosted tree model, a random forest model, a logistic regression model, a neural network, a deep neural network, or other suitable model. The machine learning model 114 may be configured to receive the features associated with an analysis object, and/or context information associated with the analysis object, and output an analysis result, such as a score indicating whether the analysis object is, for example, potentially malicious. The machine learning model may provide an output indicating a threat classification. The threat classification may indicate an evaluation of the likelihood that the analysis object is a threat. In some implementations, a threat classification may provide an output within a range (for example between 0 and 10, between 0 and 1, between 0 and 4) that relates to a probability of maliciousness. In some implementations, a threat classification may classify an analysis object into different categories such as, for example, benign, potentially malicious, malicious, type of malicious content/activity, class of malicious content/activity, attack family, or another suitable threat classification.

More generally, the pastable detection rule may include any data suitable for implementing a machine learning model within a console for an interpreter environment or the like, including rules, program logic, algorithms, and the like, along with supporting data for implementing a machine learning model such as weights, model coefficients, and so forth, along with feature extraction code or the like for conditioning data to present to the machine learning model. As described herein, such a pastable detection rule advantageously provides a portable and user-editable format for malware detection models. In one aspect, the pastable detection rule may express a machine learning model in the syntax of a pattern matching tool such as Yara, or any other tool or programming environment that can similarly receive a paste of lines of text from a user and execute the lines of text as command lines from a user. Yara is particularly useful, e.g., as a pattern matching tool commonly used in malware detection, and is thus commonly available in contexts where a machine learning model for malware detections might usefully be shared or tested. The pastable detection rule may be easily shared with others, who may copy and paste the rule for testing in any target environment having a suitable console or programming environment. The pastable detection rule also provides a human-readable expression of a machine learning model that can be modified as desired, particularly where the structure of the model communicates useful information about underlying detections to a human user.

In one aspect, a pastable detection rule is stored in a text-only format to ensure compatibility with various consoles that might receive the pastable detection rule for testing.

The memory 104 of the malicious content detection device 100 may be, for example, a random-access memory (RAM), a memory buffer, a hard drive, a solid-state drive, a read-only memory (ROM), an erasable programmable read-only memory (EPROM), and/or the like or a combination. The memory 104 can store, for example, one or more software modules and/or code that can include instructions to cause the processor 102 to perform one or more processes, functions, and/or the like (e.g., the security application rule interpreter 110 to interpret the pastable detection rule 111). In some implementations, the memory 104 may be a portable memory (for example, a flash drive, a portable hard disk, and/or the like) that may be operatively coupled to the processor 102. In other instances, the memory may be remotely operatively coupled with the security recognition device 100. For example, a remote database server may be operatively coupled to the security recognition device 100.

The memory 104 may store the pastable detection rule 111, for example, in a file 124. The pastable detection rule 111 may include data used by the machine learning model 114 to process and/or analyze an analysis object (for examples, weights associated with the machine learning model, decision points associated with the machine learning model, flow control associated with the machine learning model, Boolean logic associated with the machine learning model, and/or other information related to the machine learning model).

The memory may also include an analysis object 128. The analysis object 128 may be, may derived from, or may be based on an identified object. The analysis object 128 may be, may be derived from, or may be based on multiple or a combination of identified objects. For example, the analysis object 128 may be, may include, or may be based on any one or more of an email message, a representation of a text stream, a document, a text message, a social media post, a web site post and/or another suitable analysis object. For example, in various implementations, the file may be at least one of a Hypertext Markup Language (HTML) file(s), a JavaScript file(s), an Extensible Markup Language (XML) file, a Hypertext Preprocessor (PHP) file(s), Microsoft® office documents (for example, Word®, Excel®, PowerPoint®, and/or the like), a uniform resource locator (URL), Android Package Kit (APK) files, Portable Document Format (PDF) files, any other files having defined structure, and/or any other type of analysis object. For example, the analysis object 128 may include, may be based on, or may reference any one or more of software code, a webpage(s), a data file(s), a model file(s), a source file(s), a script(s), a process(es), a binary executable file(s), data and/or a table(s) in a database system, a development deliverable(s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the analysis object 128 may be analyzed by the security application rule interpreter 110 according to the pastable detection rule 111 to determine whether the analysis object 128 should be treated as malicious, as described in further detail herein.

In some implementations, an analysis object 128 may be, for example, a representation of a network stream or a text stream. An analysis object may include or be based on the output of one or more network sensors recording network traffic. For example, packet data may be extracted from network traffic. The analysis object may include data extracted from a data lake of sensor data.

The communication engine 106 may be a hardware device operatively coupled to the processor 102 and memory 104 and/or software stored in the memory 104 executed by the processor 102. The communication engine 106 may be, for example, a network interface card (NIC), a Wi-Fi™ module, a Bluetooth® module, a LTE module, and/or any other suitable wired and/or wireless communication device. Furthermore, the communication engine can include a switch, a router, a hub and/or any other network device. The communication engine 106 may be configured to connect the security recognition device 100 to a communication network (not shown). In some instances, the communication engine 106 may be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a GSM/EDGE network, a LTE network, a virtual network, and/or any combination thereof.

In some instances, the communication engine 106 can facilitate receiving and/or transmitting a pastable detection rule 111 and/or an analysis object 128 through a communication network. In some instances, received data may be processed by the processor 102 and/or stored in the memory 104.

In use, the malicious content detection device 100 may be configured to receive an analysis object 100, from a communication network (not shown in FIG. 1) via the communication engine 106 and/or via any other suitable method (e.g., via a removable memory device). The security application rule interpreter 110 may be configured to receive the file 124 from the communication engine 106 and obtain the pastable detection rule 111. The pastable detection rule 111 will use cause the rule interpreter 110 to receive a set of features based on the analysis object 128. The features will be provided to the machine learning model 114 and determine whether the analysis object is malicious, which may be communicated in a manner suitable to the security application rule interpreter 110. The determination may be stored or cause other activity to be undertaken, for example, to respond to, block, or remediate the malicious activity.

Figure 2:
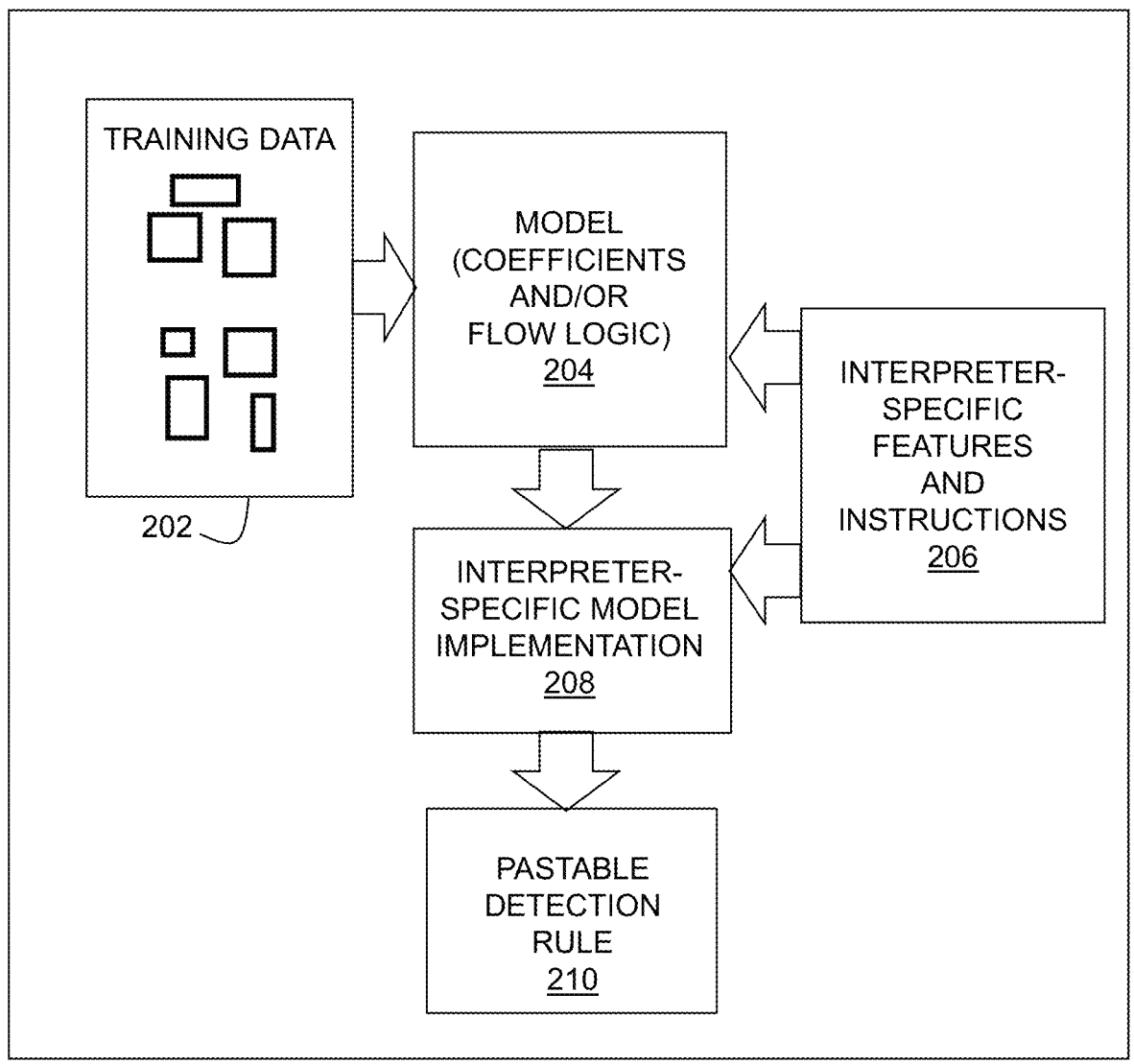
FIG. 2 illustrates a rule generation engine according to embodiments.

Referring to FIG. 2, an exemplary machine learning rule generation engine 200 includes training data 202, which are used to generate a detection model 204. Training data 202 may include analysis object samples used to train a detection model 204. In some instances, training data 202 may include multiple sets of samples. Each set of samples may contain at least one set of input information and an associated desired output value or label, and typically includes many samples and/or sets of samples. The training data 202 may include analysis objects and context information for the analysis objects. In some implementations, the training data 202 may include malicious analysis objects in one location (e.g., file system directory or group of directories) and benign analysis objects in another location (e.g., file system directory or group of directories). In some implementations, the training data 202 may include input messages with associated threat scores. In some implementations, the training data 202 may include contextual data, such as reputation information or source information. In some implementations, the training data 202 may include features for analysis objects. In some implementations, the training data 202 may include malicious and benign files, context information for the files, and threat scores for the files.

The training data 202 may be used to train the detection model 204 to perform a security recognition task. In some implementations, features are automatically identified based on the analysis objects provided. For example, a first set of features may be determined from the analysis objects, and a second set of features may be refined from the first set based on which features are determined to be most useful in distinguishing malicious files from benign files. The features that are used may be based on the interpreter-specific features and instructions 206. For example, if the rule interpreter enables searching for strings in files, the features may include strings found in a file. For example, if the rule interpreter enables determining an entropy for a number of bytes (a byte window), the features may include determining the entropy of a byte window.

As noted above, while the present description focuses on files, the techniques described herein may be readily adapted to use with other observables, artifacts, or computing objects that might be usefully classified as benign and malicious. For example, this may include portable executable (PE) files, script files, text files, HTML files, XML files, documents, processes, network flows, network streams, memory extracts, process memory states, registry entries, messages (e.g., text messages, email messages, social network posts), web sites, databases, browsing histories, or any other suitable analysis object or combination of objects. Recognition tasks may be applied, for example, to features determined by static analysis, dynamic analysis, behavior analysis, activity analysis, or any other suitable features.

The selected features may be implemented in the model 204 using machine learning techniques. For example, a random forest approach may be used to generate decision trees that can distinguish between the labeled analysis objects. For example, a logistic regression model may be used to generate an equation that can be used to generate between the labeled analysis objects. In some implementations, more than one model may be implemented, with the models differing in the model architecture. One of the implemented models may be selected as a selected model 204 based on performance characteristics in distinguishing the labeled analysis objects.

The model 204 may be translated into an interpreter-specific model implementation 208 based on the interpreter-specific features and instructions supported by the target rule interpreter 206. For example, if the target rule interpreter does not support an exponentiation calculation, the model may be modified to perform an alternate calculation. For example, if the target rule interpreter does not support if-then statements, but has a logic testing capability, the model may be translated to use the logic testing capability.

The interpreter-specific model implementation may be translated into a pastable detection rule 210 that may be interpreted by the rule interpreter for which it is designed. For example, the pastable detection rule 210 may be in a form that can be copied and pasted into an interface for the target rule interpreter. For example, the pastable detection rule 210 may be in a form that can be copied into a file that includes one or more rules that may be the interpreted by the rule interpreter. For example, the pastable detection rule 210 may have instructions to access features that are available to rules for that rule interpreter, and to apply those features to the model. For example, the pastable detection rule 210 may use instructions that are available to rules interpreted by that rule interpreter.

Figure 3:
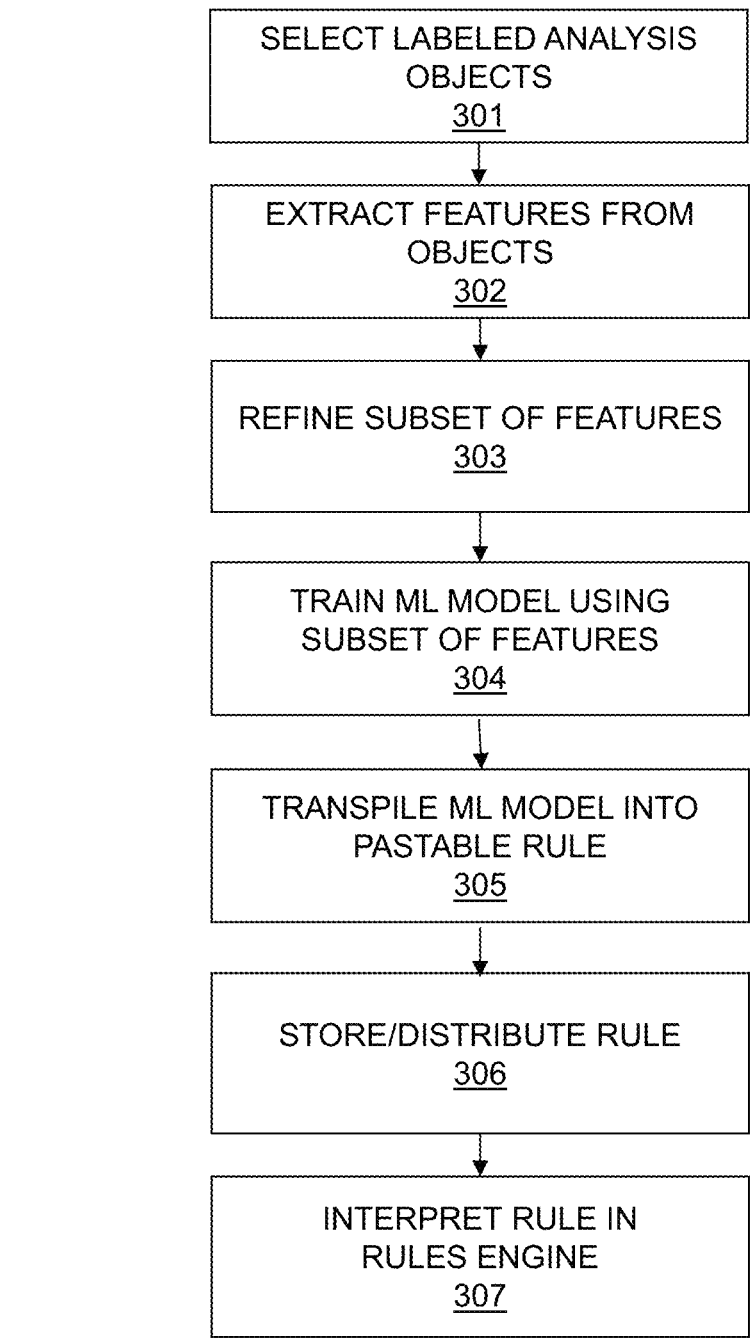
FIG. 3 illustrates a flowchart according to embodiments.

Referring to FIG. 3, a method 300 for generating and using a pastable rule may include, at block 301, selecting labeled analysis objects. This may include selecting analysis objects labeled as malicious and analysis objects labeled as benign. In some implementations, the label may be a number. In some implementations, the label may be a letter or a word. In some implementations, the labels are implied by the directories in which the analysis objects are stored. For example, analysis objects in a directory named "mal" may be labeled malicious, and analysis objects in a directory named "ben" may be labeled benign. Some of the analysis objects may be used for training and some of the analysis objects may be used for testing. Analysis objects used for training or testing may be selected randomly.

At block 302, the method 300 may include extracting features from the analysis objects. In some implementations, the features to be extracted may be predetermined, for example, ascii strings in the analysis objects, or byte windows of a predetermined number of bytes. In some implementations, the type of features may be selected from a number of different features based on characteristics of the analysis objects.

At block 303, a subset of the extracted features may be refined from the extracted features. In some implementations, the features most useful for distinguishing the analysis objects may be determined. This may be accomplished using any suitable feature selection technique. For example, the features most useful for distinguishing analysis objects may be determined by generating a random forest and determining which features are used most often in the trees of the random forest.

At block 304, when the subset of extracted features has been determined, the subset of features may be used to train a model using machine learning techniques. The model may be any suitable model, for example, a logistic regression model, a random forest model, a decision tree model, a gradient boosted tree model, a neural network, a deep neural network, or another type of model. The training may be conducted using conventional training techniques. The training may include testing of the model using labeled analysis objects that were allocated to be used as test data. The training may include generating performance characteristics of the model. For example, a ROC curve may be determined for the model.

In some implementations, a number of models may be trained. For example, models with different architectures or different parameters may be trained. A model may be selected from the number of models, for example, based on performance characteristics.

At block 305, the trained model may be transpiled into a pastable rule. The pastable rule may be configured to be interpreted by the rule interpreter.

At block 306, the pastable rule may be stored or distributed. The pastable rule may be uploaded or posted, for example, on a web site, in a blog, or in a source code repository. The pastable rule may be communicated as part of a subscription. The pastable rule may be included in updates to users of a security product. The pastable rule may be sent by a messaging service, for example, in the text of the email or as an attachment. The pastable rule may be included in a social network post.

At block 307, the pastable rule may be provided to a rules engine. The pastable rule may be provided in a user interface for the rules engine. The pastable rule may be provided to the rules engine in a file that is read by the rules engine. The pastable rule may be automatically downloaded by the rules engine or received by the security product that is associated with the rules engine as part of an update.

Figure 4:
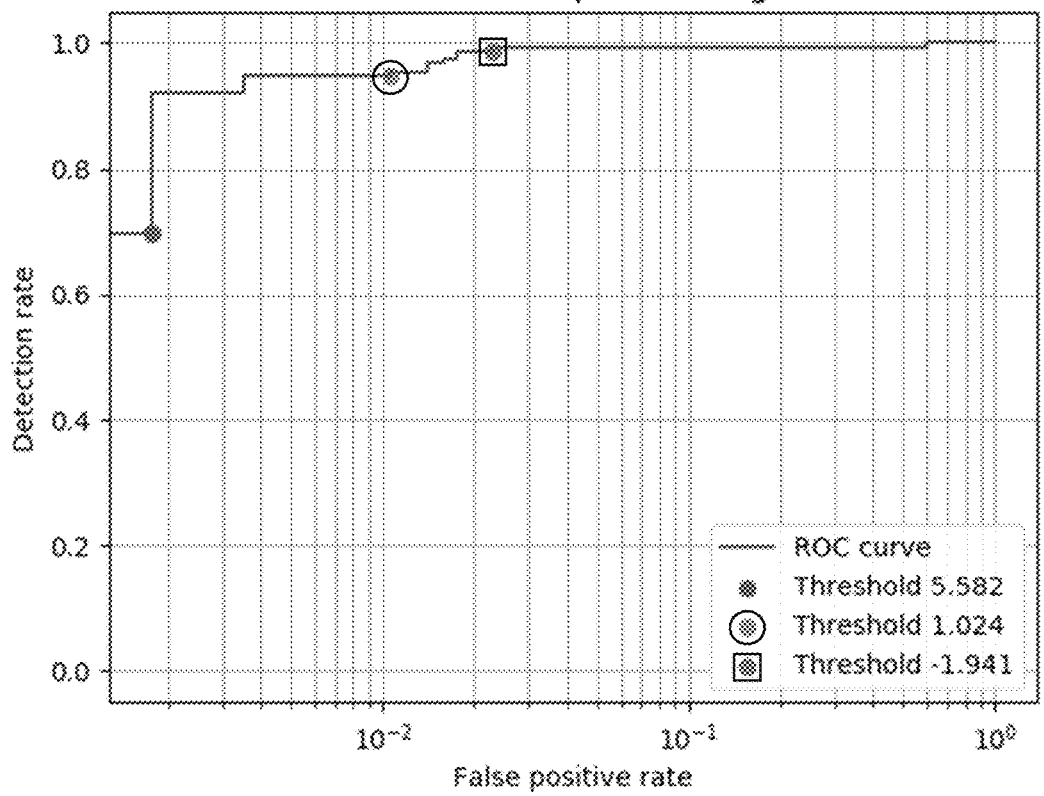
FIG. 4 illustrates ROC curve according to embodiments.

Referring to FIG. 4, an exemplary ROC curve 400 for a model shows a detection rate plotted against a false positive rate, based on changes to a threshold. For the example shown, the configuration is a threshold for a logistic regression model. A threshold of −1.941 shows the highest detection rate with a relatively high false positive rate. A threshold of 1.024 has a lower detection rate with an improved false positive rate. A threshold of 5.582 has a lower detection rate with an even more improved false positive rate.

A given user may have a specified false positive rate tolerance, and so the ROC curve 400 may be used to select a threshold setting for the user. For example, a given user may have a preference for high detections and a tolerance for false detections, and the model may be configured accordingly. For example, configurations or models may be selected based on user preferences.

Figure 5:
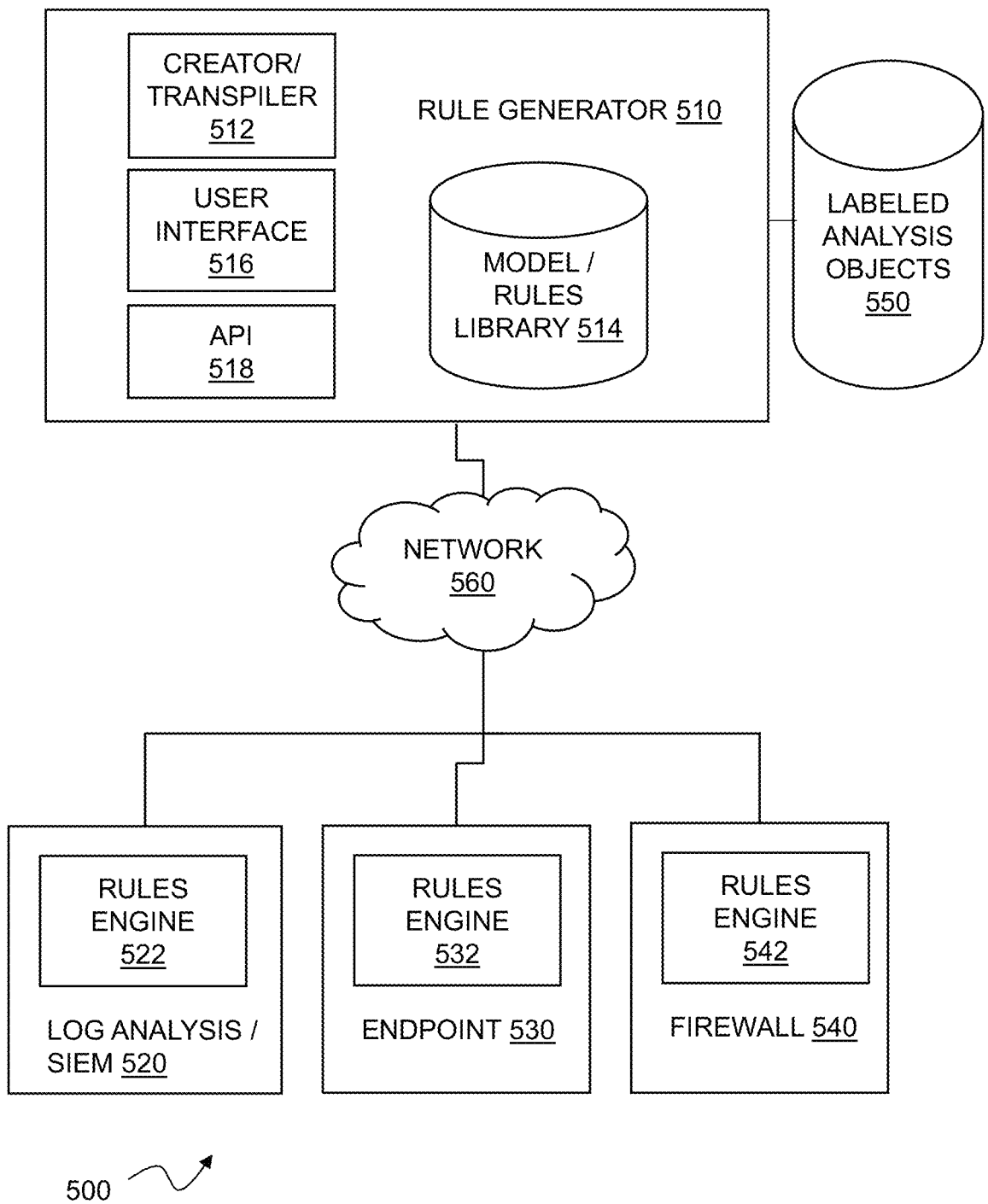
FIG. 5 illustrates a cybersecurity system, according to an embodiment.

Referring to FIG. 5, a cybersecurity system 500 includes a rule generation system 510 in communication with exemplary devices (e.g., Log Analysis/SIEM system 520, Endpoint 530, Firewall 540) which devices (520, 530, 540) have a respective rules engine (522, 532, 542). The SIEM 520, Endpoint 530, and Firewall 540 are intended to be exemplary devices representative of devices that may be part of a given enterprise network. In a typical network there may be many different devices of different types and they may be connected in a variety of network configurations. As shown, each of the devices (520, 530, 540) may be configured with the same or a different rules engine (522, 532, 542) as part of their security protection. Rules generated by the rules generator 510 may be used in each of the rules engines (522, 532, 542) to perform security recognition tasks.

The rule generator 510 may be implemented on any suitable device or compute instance. For example, the rule generator may be implemented on a server computer. The rule generator 510 may be implemented in a cloud compute instance. The rule generator may be implemented on one of the devices (520, 530, 540). The rule generator 510 may be in communication with one or more of the devices (520, 530, 540) over a computer network 560.

The rule generator 510 may implement methods for rule generation as described herein. The rule generator 510 may be implemented as a service for generating rules as requested by a user. For example, a user may provide or direct the rule generator 510 to analysis objects available in the collection of labeled analysis objects 550 or via the network 560. The user may request the generation of a rule. The user may specify the type of rule interpreter with which the rule will be used.

The rule generator 510 may have access to a collection of labeled analysis objects 550, which may be used for generation of a rule. For example, the labeled analysis objects 550 may include malicious objects and benign analysis objects.

The rule generator 510 may include a rule creator/transpiler 512 for generating rules as described herein. The rule creator/transpiler 512 may generate a model using specified labeled analysis objects, where the model may be targeted for a given rules engine (522, 532, 542). The rule creator/transpiler 512 may transpile a model for use as a rule for a given rules engine (522, 532, 542).

The rule generator 510 may include a model/rules library 514 for storing models and rules generated by the rules generator 510 as well as models and rules generated by other means. For example, the model/rules library 514 may include models that were previously developed. If a model already exists, creator/transpiler 512 may provide a new rule for a given rules engine based on an already-developed model. The model/rules library 514 may include rules that have previously been developed for a given rules engine, so that they can be provided to a user right away if they have been developed previously.

The rule generator 510 may include a user interface 516 which may be used by a user to provide or direct the rule generator 510 to labeled analysis objects, for example, in the collection of labeled analysis objects 550 or to add to the collection of labeled analysis objects 550. The user interface 516 may be used by a user to request generation of a rule. The user interface 516 may be used by a user to download a rule that has been generated. The user interface 516 may be used by a user to request a rules update.

The rule generator 510 may include an application programming interface (API) 518 that allows for programmatic interaction with the rule generator 510. The functionality of the user interface 516 also may be available to a user via the API 518 so that other systems may provide a user interface. The API 518 allows for automatic or machine interaction to request a model and/or a rule to be generated by the Creator/Transpiler 512. For example, if a suspicious sample is detected by the SIEM 520, the endpoint 530 or the Firewall 540, the device (520, 530, 540) may be provided to the rule generator 510 to consider to be a labeled analysis object, and a rule may be requested to be generated. The rule then may be provided to the device (e.g., 520, 530, 540) that requested it as well as to other devices (520, 530, 540).

In some implementations, a user may access the user interface 516 and/or the API 518 to provide the rule generator 510 with target analysis objects. For example, the target analysis objects may be samples of malware identified by the user. The user may request or have previously configured via the user interface 516 or the API 518 target rules engines (522, 532, 542) that are in the user's network for which a rule is desired. The user may request one or more rules from the rule generator configured for the target rules engine(s) (522, 532, 542) that detect the target analysis objects. The rule generator may use a library of labeled analysis object 550, for example, a library of benign analysis objects, and generate a pastable rule as described here. In some implementations, labeled analysis objects may be selected based on a target environment. In some implementations, features used in the rule may be selected based on the target rules engine(s) (522, 532, 542).

Figure 6:
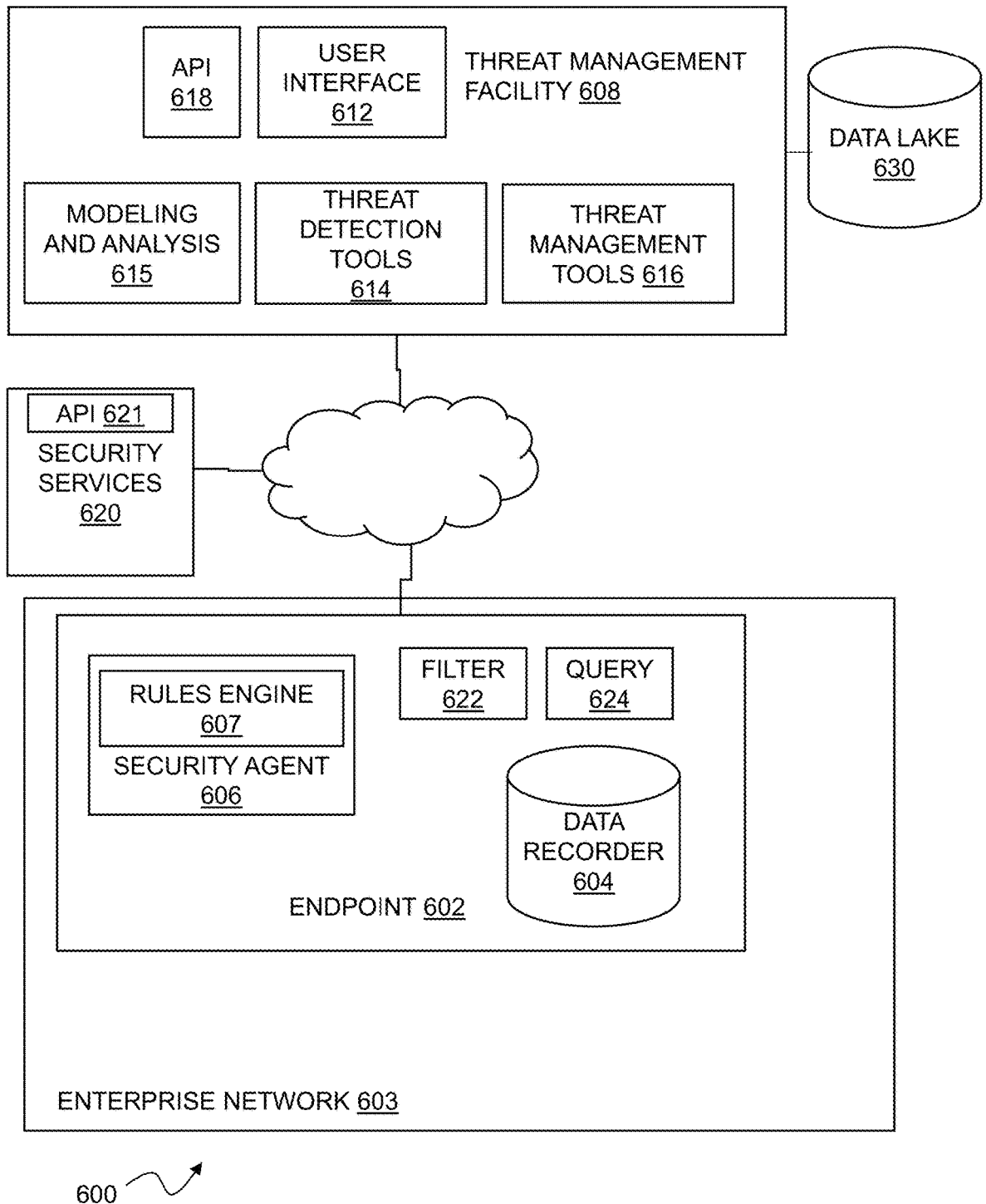
FIG. 6 illustrates a threat management system, according to an embodiment.

Referring to FIG. 6, a system 600 for enterprise network threat detection may include any suitable tools and techniques for threat management, such as those contemplated herein. In the system 600, a number of endpoints such as the endpoint 602 in an enterprise network 603 may log events in a data recorder 604. A local agent on the endpoint 602, depicted here as the security agent 606, may identify events, filter the event data, and feed a filtered data stream to a threat management facility 608. The security agent 606 may include a rules engine 607.

The threat management facility 608 may be a centrally administered threat management facility or local to an enterprise network or collection of enterprise networks. In some implementations, the threat management facility 608 can locally or globally tune filtering by local agents 606 based on the data stream and can query local event data recorders for additional information where necessary or helpful in threat detection or forensic analysis. The threat management facility 608 may also or instead store and deploy a number of security tools such as a web-based user interface 612 to aid in the identification and assessment of potential threats by a human user. The user interface 612 may support the generation of new machine learning models. This may, for example, include machine learning analysis of new code samples or models. The threat management facility may include a rule generator, for example as part of the modeling and analysis system 615. More generally, the threat management facility 608 may provide any of a variety of threat management tools 616 to aid in the detection, evaluation, and remediation of threats or potential threats.

The threat management facility 608 may perform a range of threat management functions. The threat management facility 608 may generally include a user interface 612 for access to threat management and network administration functions, threat detection tools 614, an application programming interface 618 for security services 620 to integrate with threat management facility 608. The threat management facility may also communicate to other security services 620 using an API, such as exemplary API 621 provided by a security service.

The user interface 612 may include a website or other graphical interface or the like, and may generally provide an interface for user interaction with the threat management facility 608, e.g., for threat detection, network administration, audit, configuration and so forth. This user interface 612 may generally facilitate notification and determination of threats and providing controls for a user to dispose of such threats as desired, e.g., by permitting execution or access, by denying execution or access, or by engaging in remedial measures such as sandboxing, quarantining, vaccinating, and so forth.

The threat detection tools 614 may include any suitable threat detection tools, algorithms, techniques, or any other tools or the like useful for detecting threats or potential threats within an enterprise network. This may, for example, include signature-based tools, behavioral tools, machine learning models, and so forth. In general, the threat detection tools 614 may use event data provided by endpoints within the enterprise network, as well as any other available data such as network activity, heartbeats, and so forth to detect malicious software or potentially unsafe conditions for a network or endpoints connected to the network. In one aspect, the threat detection tools 614 may usefully integrate event data from a number of endpoints (including, e.g., network components such as gateways, routers and firewalls) for improved threat detection in the context of complex or distributed threats. The threat detection tools 614 may also or instead include tools for reporting to a separate modeling and analysis module 615, e.g., to support further investigation of security issues, creation or refinement of threat detection models or algorithms, review and analysis of security breaches and so forth. The threat detection tools 614 may include models and/or rules developed with a rule generator.

The threat management tools 616 may generally be used to manage or remediate threats to the enterprise network that have been identified with the threat detection tools 614 or otherwise. Threat management tools 616 may, for example, include tools for detecting, convicting, sandboxing, quarantining, removing, or otherwise identifying, remediating or managing malicious code or malicious activity, e.g., using any of the techniques described herein.

In general, the application programming interface 618 may support programmatic connections with security services 620, which may be third-party security services. The application programming interface 618 may, for example, connect to Active Directory or other customer information about files, data storage, identities and user profiles, roles, access privileges and so forth. More generally the application programming interface 618 may provide a programmatic interface for customer or other third-party context, information, administration and security tools, and so forth. The application programming interface 618 may also or instead provide a programmatic interface for hosted applications, identity provider integration tools or services, and so forth. The application programming interface 618 may provide programmatic access to a rule generator, model/rule library, and labeled analysis objects.

The endpoint 602 may be any endpoint or other compute instance, for example, such as those described herein. This may, for example, include end-user computing devices, mobile devices, firewalls, gateways, servers, routers and any other computing devices or instances that might connect to an enterprise network. As described, the endpoint 602 may generally include a security agent 606 that locally supports threat management on the endpoint 602, such as by monitoring for malicious activity, managing security components on the endpoint 602, maintaining policy compliance, and communicating with the threat management facility 608 to support integrated security protection as contemplated herein. The security agent 606 may, for example, coordinate instrumentation of the endpoint 602 to detect various event types involving various computing objects on the endpoint 602, and supervise logging of events in a data recorder 604. The security agent 606 may also or instead scan computing objects such as electronic communications or files, monitor behavior of computing objects such as executables, and so forth. The security agent 606 may, for example, apply rules, signature-based or behavioral threat detection techniques, machine learning models (e.g. models developed or configured by the modeling and analysis platform 615), or any other tools or the like suitable for detecting malware or potential malware on the endpoint 602.

The data recorder 604 may log events occurring on or related to the endpoint. This may include, for example, detections by a cybersecurity system, for example, implemented in the security agent 606. This may, for example, include applying rules interpreted by a rules engine 607. This may, for example, include events associated with computing objects on the endpoint 602 such as file manipulations, software installations, and so forth. This may also or instead include activities directed from the endpoint 602, such as requests for content from Uniform Resource Locators or other network activity involving remote resources. The data recorder 604 may record data at any frequency and any level of granularity consistent with proper operation of the endpoint 602 in an intended or desired manner.

The endpoint 602 may include a filter 622 to manage a flow of information from the data recorder 604 to a remote resource such as the threat management facility 608. The information from the data recorder 604 may be stored in a data lake 630. In this manner, a detailed log of events may be maintained locally in the data recorder 604 on each endpoint, while network resources can be conserved for reporting of a filtered event stream that contains information believed to be most relevant to threat detection that is stored in the data lake 630. The filter 622 may also or instead be configured to report causal information that causally relates collections of events to one another. In general, the filter 622 may be configurable so that, for example, the threat management facility 608 can increase or decrease the level of reporting based on a current security status of the endpoint, a group of endpoints, the enterprise network and the like. The level of reporting may also or instead be based on currently available network and computing resources, or any other appropriate context. The data lake 630 thus may include labeled analysis objects that may be used to generate rules.

The endpoint 602 may include a query interface 624 so that remote resources such as the threat management facility 608 can query the data recorder 604 remotely for additional information. This may include a request for specific events, activity for specific computing objects, or events over a specific time frame, or some combination of these. Thus for example, the threat management facility 608 may request all detections by one or more cybersecurity systems, changes to the registry of system information for the past forty eight hours, all files opened by system processes in the past day, all network connections or network communications within the past hour, or any other parametrized request for data and/or events on the endpoint 602 or monitored by the data recorder 604. In another aspect, the entire data log, or the entire log over some predetermined window of time, may be requested for further analysis at a remote resource.

It will be appreciated that communications among security services 620, a threat management facility 608, and one or more endpoints such as the endpoint 602 may be facilitated by using consistent naming conventions across products and machines. For example, the system 600 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

In various implementations, the cybersecurity system evaluation and configuration may be accomplished via the user interface 612, for example, as part of the modeling and analysis component 615 of the threat management facility 608. The modeling and analysis component 615 may access data in one or more data recorders 602 of systems in a target environment (e.g., the enterprise network 603), for example, using the query system 624.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method, comprising:
    extracting a plurality of strings from a set of malicious files and a set of benign files;
    determining a subset of the extracted plurality of strings that are most useful in distinguishing the set of malicious files from the set of benign files;
    training a machine learning model to use the subset of the plurality of strings to perform a malware detection by distinguishing between the set of malicious files and the set of benign files;
    determining one or more features supported by a rule interpreter associated with a computer security application;
    transpiling the machine learning model into a pastable rule of text for a console of an interpreter environment for the rule interpreter, the pastable rule configured, based on the one or more features supported by the rule interpreter, to be interpreted by the rule interpreter to perform the malware detection; and
    causing the pastable rule to be run in the rule interpreter associated with the computer security application to extract a number of strings from one or more files and to recognize malicious ones of the one or more files based on the number of strings.

2. The method of claim 1, further comprising validating the machine learning model by generating a ROC curve for the machine learning model.

3. The method of claim 1, further comprising storing the rule in a memory associated with the computer security application.

4. The method of claim 1, further comprising communicating the rule to a rules engine remote from the computer security application.

5. A computer program product comprising computer readable code embodied in a non-transitory computer readable medium that when executing performs the steps of:
- extracting features from a set of malicious computing objects and a set of benign computing objects, wherein the features may be obtained from a computer security application, the computer security application having a rule interpreter;
- determining a subset of the extracted features that are most useful in distinguishing the set of malicious computing objects from the set of benign computing objects;
- training a machine learning model to use the subset of the extracted features to perform a malware detection by distinguishing between the set of malicious computing objects and the set of benign computing objects;
- determining one or more features supported by the rule interpreter associated with the computer security application;
- transpiling the machine learning model into a pastable rule of text for a console of an interpreter environment for the rule interpreter, the pastable rule configured, based on the one or more features supported by the rule interpreter, to be interpreted by the rule interpreter of the computer security application to perform the malware detection; and
- storing the pastable rule in a data store.

6. The computer program product of claim 5, further comprising computer readable code that when executing performs the step of distributing the pastable rule to one or more other security applications.

7. The computer program product of claim 5, wherein the features comprise strings.

8. The computer program product of claim 5, wherein the features comprise n-grams.

9. The computer program product of claim 5, further comprising computer readable code that when executing performs the step of validating the machine learning model by generating a ROC curve for the machine learning model.

10. The computer program product of claim 5, further comprising computer readable code that when executing performs the step of communicating the pastable rule to a rules engine for one or more other security applications.

11. The computer program product of claim 5, further comprising computer readable code that when executing performs the step of causing the pastable rule to be run in the interpreter associated with the computer security application to extract strings from files and to recognize malicious files.

12. The computer program product of claim 5, wherein the machine learning model comprises a logistic regression model.

13. The computer program product of claim 12, wherein the logistic regression model is translated into a mathematical equation that may be interpreted by a rule interpreter.

14. The computer program product of claim 5, wherein the machine learning model comprises a random forest model.

15. The computer program product of claim 14, wherein the random forest model is translated into instructions implementing Boolean logic.

16. The computer program product of claim 5, further comprising computer readable code that, when executing, performs the step of receiving a user request to copy the pastable rule from the data store and paste the pastable rule into the console for the rule interpreter.

17. The computer program product of claim 16, further comprising computer readable code that, when executing, performs the step of receiving a second user request to execute the pastable rule with the rule interpreter.

18. The computer program product of claim 5, wherein the rule interpreter includes a pattern matching tool.

19. The method of claim 1 further comprising displaying the pastable rule to a user in a display, wherein the display is configured to receive a copy and paste of a command from the user.

20. The method of claim 1, further comprising displaying the pastable rule to a user in a display, wherein the display is configured to receive a modification to the pastable rule from the user.

* * * * *